(12) United States Patent
Yoshikawa

(10) Patent No.: US 12,341,633 B2
(45) Date of Patent: Jun. 24, 2025

(54) COMMUNICATION DEVICE, COMMUNICATION METHOD THEREOF, INFORMATION PROCESSING DEVICE, CONTROL METHOD THEREOF, AND COMPUTER-READABLE STORAGE MEDIUM

(71) Applicant: CANON KABUSHIKI KAISHA, Tokyo (JP)

(72) Inventor: Yuki Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/664,784

(22) Filed: May 15, 2024

(65) Prior Publication Data

US 2024/0305505 A1 Sep. 12, 2024

Related U.S. Application Data

(63) Continuation of application No. 18/203,746, filed on May 31, 2023, now Pat. No. 12,047,207, which is a
(Continued)

(30) Foreign Application Priority Data

Feb. 28, 2019 (JP) .................................. 2019-036405

(51) Int. Cl.
*H04L 25/03* (2006.01)
*H04L 5/00* (2006.01)
*H04L 27/26* (2006.01)

(52) U.S. Cl.
CPC ...... *H04L 25/03006* (2013.01); *H04L 5/0048* (2013.01); *H04L 27/2603* (2021.01); *H04L 2025/03815* (2013.01)

(58) Field of Classification Search
CPC ............ H04B 7/0452; H04L 25/03006; H04L 27/2602; H04L 5/0044; H04L 5/0048; H04L 27/26; H04L 27/261; H04L 27/2613
See application file for complete search history.

(56) References Cited

U.S. PATENT DOCUMENTS 8,773,969 B1 7/2014 Zhang
9,226,270 B1 12/2015 Zhang
(Continued)

FOREIGN PATENT DOCUMENTS

CN 102148661 A 8/2011
CN 103931153 A 7/2014
(Continued)

OTHER PUBLICATIONS

Summons to Attend Oral Proceedings issued by the European Patent Office on Aug. 8, 2024 in corresponding EP Patent Application No. 20762282.0.
(Continued)

*Primary Examiner* — Khanh C Tran
(74) *Attorney, Agent, or Firm* — Carter, DeLuca & Farrell LLP

(57) ABSTRACT

A communication device communicates a radio frame including a preamble and a data field of a physical layer (PHY). The preamble includes an L-STF (Legacy Short Training Field), an L-LTF (Legacy Long Training Field), an L-SIG (Legacy Signal Field), an EHT-SIG-A (Extremely High Throughput Signal A Field), an EHT-STF, and an EHT-LTF, and the EHT-SIG-A includes a field indicating a standard that the radio frame complies with.

18 Claims, 4 Drawing Sheets

Related U.S. Application Data continuation of application No. 17/863,635, filed on Jul. 13, 2022, now Pat. No. 11,706,058, which is a continuation of application No. 17/412,660, filed on Aug. 26, 2021, now Pat. No. 11,424,967, which is a continuation of application No. PCT/JP2020/004216, filed on Feb. 5, 2020.

(56) References Cited

U.S. PATENT DOCUMENTS

| | | | |
|---|---|---|---|
| 10,411,846 | B1 | 9/2019 | Zhang |
| 11,979,812 | B2 | 5/2024 | Patil |
| 2011/0280232 | A1 | 11/2011 | Wu |
| 2014/0192823 | A1* | 7/2014 | Tetzlaff .................. H04L 69/04 370/474 |
| 2014/0286226 | A1* | 9/2014 | Seok .................... H04W 56/00 370/312 |
| 2015/0117433 | A1 | 4/2015 | Zhang |
| 2016/0087766 | A1 | 3/2016 | Sun |
| 2016/0105535 | A1 | 4/2016 | Kenny |
| 2018/0263045 | A1 | 9/2018 | Zhou |
| 2018/0317128 | A1 | 11/2018 | Chun |
| 2019/0288892 | A1 | 9/2019 | Son |
| 2019/0373586 | A1 | 12/2019 | Verma |
| 2020/0076552 | A1 | 3/2020 | Cherian |
| 2020/0112408 | A1 | 4/2020 | Verma et al. |
| 2020/0213933 | A1 | 7/2020 | Patil |
| 2020/0382998 | A1 | 12/2020 | Cao |
| 2021/0126755 | A1 | 4/2021 | Gan |
| 2021/0135711 | A1* | 5/2021 | Beg ........................ G01S 13/46 |
| 2021/0135718 | A1* | 5/2021 | Beg ...................... H04B 7/0465 |
| 2021/0297189 | A1 | 9/2021 | Yoshikawa |
| 2021/0368506 | A1 | 11/2021 | Yoshikawa |
| 2021/0384943 | A1 | 12/2021 | Yoshikawa |
| 2022/0248465 | A1 | 8/2022 | Yoshikawa |
| 2023/0041149 | A1 | 2/2023 | Yoshikawa |
| 2023/0097269 | A1 | 3/2023 | Yoshikawa |
| 2024/0314843 | A1 | 9/2024 | Yoshikawa |

FOREIGN PATENT DOCUMENTS

| | | |
|---|---|---|
| CN | 105637948 A | 6/2016 |
| CN | 106664165 A | 5/2017 |
| EP | 3193484 A1 | 7/2017 |
| JP | 2008-252867 A | 10/2008 |
| JP | 2010-098339 A | 4/2010 |
| JP | 2017-011486 A | 1/2017 |
| JP | 2018-050133 A | 3/2018 |
| WO | 2012/090448 A1 | 7/2012 |
| WO | 2017/061492 A1 | 4/2017 |
| WO | 2019/009099 A1 | 1/2019 |

OTHER PUBLICATIONS

Park, E. et al., "Overview of PHY Features for EHT" IEEE 802.11181967r1 (Jan. 2019) pp. 1-22.

Korean Notice of Allowance issued in corresponding KR Patent Application No. 10-2021-7026653, dated Apr. 28, 2024, with English translation.

International Search Report issued by the Japan Patent Office on May 12, 2020 in corresponding International Application No. PCT/JP2020/004216, with English translation.

Park, E. et al., "Overview of PHY Features for EHT" IEEE 802.11181967r1, <URL:https:mentor.ieee.org802. 11dcn181118196701Oehtoverviewofphyfeaturesforeht. pptx> (Jan. 2019) pp. 1-11, in particular, slides 5, 6, 9, 18.

Lanante, L. et al., "Extensible Preamble Format Design" IEEE 802.11-14/0853r1 (Jul. 2015) pp. 1-9, XP068098061.

Extended European Search Report issued in corresponding EP Patent Application No. 20762282.0, dated Oct. 28, 2022.

Notice of Reasons for Refusal issued by the Japan Patent Office on Dec. 5, 2022 in corresponding JP Patent Application No. 2019-036405, with English translation.

Latif, T. et al., "HARQ in EHT" IEEE 802. 11-18/2029r1 (Nov. 2018) pp. 1-12.

Korean Office Action issued in corresponding KR Patent Application No. 10-2021-7026653, dated Nov. 24, 2023, with English translation.

Chinese Office Action issued in corresponding CN Patent Application No. 202080016855.7, dated Sep. 1, 2023, with English translation.

Lee, S. et al., "PHY section editorial comments on D0.4" IEEE 802.11-16/1179r0 (Sep. 2016) pp. 1-15, XP068107588.

European Office Action issued by the European Patent Office on Apr. 2, 2025 in corresponding EP Patent Application No. 20762282. 0.

\* cited by examiner

COMMUNICATION DEVICE, COMMUNICATION METHOD THEREOF, INFORMATION PROCESSING DEVICE, CONTROL METHOD THEREOF, AND COMPUTER-READABLE STORAGE MEDIUM

CROSS-REFERENCE TO RELATED APPLICATIONS

This application is a Continuation of U.S. patent application Ser. No. 18/203,746, filed on May 31, 2023, which is a Continuation of U.S. patent application Ser. No. 17/863,635, filed on Jul. 13, 2022, which is a Continuation of U.S. patent application Ser. No. 17/412,660, filed on Aug. 26, 2021, which is a Continuation of International Patent Application No. PCT/JP2020/004216, filed Feb. 5, 2020, which claims the benefit of Japanese Patent Application No. 2019-036405 filed Feb. 28, 2019, both of which are hereby incorporated by reference herein in their entirety.

BACKGROUND OF THE INVENTION

Field of the Invention

The present invention relates to a communication device, a communication method thereof, an information processing device, a control method thereof, and a program and, more particularly, to a communication control technique in a wireless LAN.

Background Art

As a communication standard concerning a wireless LAN (Wireless Local Area Network), the IEEE (Institute of Electrical and Electronics Engineers) 802.11 standard is known. In the IEEE802.11ax standard that is the latest standard of the IEEE802.11 standard series, not only a high peak throughput but also improvement of a communication speed under a congestion situation is implemented using OFDMA (Orthogonal Frequency-Division Multiple Access) (see PTL 1).

Currently, in order to further improve throughput, a study group called IEEE802.11EHT (Extremely High Throughput) has been formed as a successor standard of IEEE802.11ax.

CITATION LIST

Patent Literature

PTL 1: Japanese Patent Laid-Open No. 2018-050133

As many standards have been formulated so far, it is expected that new standards will appear in the future. On the other hand, concerning a radio frame complying with a new standard, a communication device complying with only an old-generation standard needs to continuously read the frame until it becomes clear that the radio frame complies with the standard to which the self-device is not adaptable, and this leads to an increase in power consumption.

SUMMARY OF THE INVENTION

The present invention provides a technique of preventing a communication device from unnecessarily continuing to read a radio frame upon receiving a radio frame complying with a standard to which the device is not adaptable.

According to one aspect of the present invention, there is provided a communication device that transmits or receives a radio frame including a preamble and a data field of a physical layer (PHY), wherein the preamble includes an L-STF (Legacy Short Training Field), an L-LTF (Legacy Long Training Field), an L-SIG (Legacy Signal Field), an EHT-SIG-A (Extremely High Throughput Signal A Field), an EHT-STF (EHT Short Training Field), and an EHT-LTF (EHT Long Training Field), and the EHT-SIG-A includes a field indicating a standard that the radio frame complies with.

Further features of the present invention will become apparent from the following description of exemplary embodiments with reference to the attached drawings.

DESCRIPTION OF THE EMBODIMENTS

Figure 1:
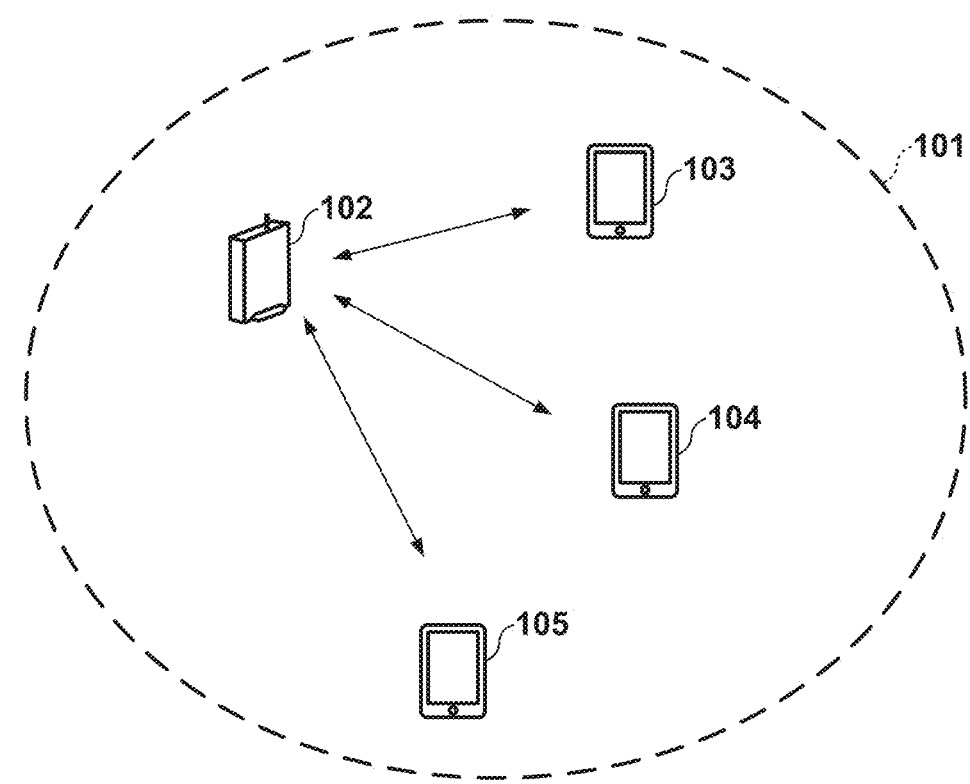
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network includes one access point (AP) and three stations (STAs). Note that each of an AP 102 and an STA 103 complies with IEEE802.11EHT (Extremely High Throughput), and is configured to be capable of performing wireless communication complying with standards defined before the IEEE802.11EHT standard. An STA 104 is an STA that is adaptable to the IEEE802.11ax standard but not to IEEE802.11EHT. Also, an STA 105 is an STA that is adaptable to communication standards after the IEEE802.11EHT. Note that the name "IEEE802.11EHT" is provided for convenience, and can be another name when the standard was established, but this specification and the appended claims are to cover all the standards that can support the processing to be described later. In the following description, in a case in which a specific device is not referred to or the like, the access point may be referred to as "AP" and the station (terminal) may be referred to as "STA" without reference numerals. Note that in FIG. 1, the wireless communication network including one AP and three STAs is shown as an example, but the numbers of these communication devices may be more or less than shown. In an example, no AP may exist when the STAs communicate with each other. In FIG. 1, the communicable area of the network formed by the AP 102 is indicated by a circle 101. Note that this communicable area may cover a larger area, or may cover only a smaller area. Note that it may be understood that EHT is an acronym of Extreme High Throughput.

(Device Configuration)

Figure 3:
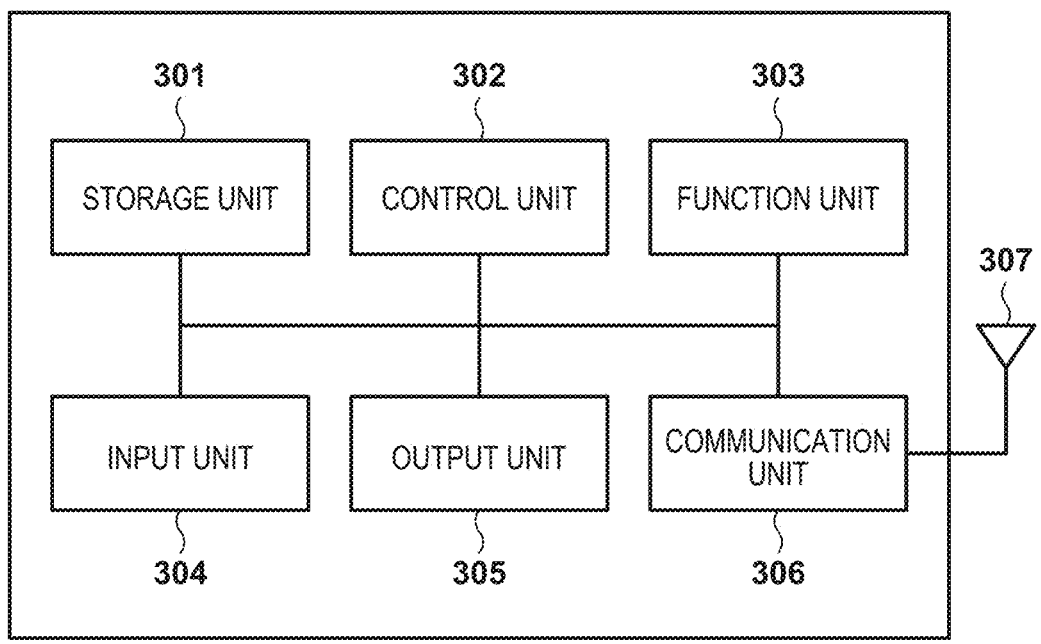
FIG. 3 is a block diagram showing an example of the hardware configuration of the communication device.

FIG. 3 shows an example of the hardware configuration of each of the communication devices (the AP and the STAs). The communication device includes, as an example of its hardware configuration, a storage unit 301, a control unit 302, a function unit 303, an input unit 304, an output unit 305, a communication unit 306, and an antenna 307.

The storage unit 301 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 302 executes the programs stored in the storage unit 301, thereby controlling the entire device. Note that the control unit 302 may control the entire device by cooperation of the programs stored in the storage unit 301 and an OS (Operating System).

In addition, the control unit 302 controls the function unit 303 to execute predetermined processing such as image capturing, printing, or projection. The function unit 303 is hardware used by the device to execute predetermined processing. For example, if the device is a camera, the function unit 303 is an image capturing unit and performs image capturing processing. For example, if the device is a printer, the function unit 303 is a printing unit and performs print processing. For example, if the device is a projector, the function unit 303 is a projection unit and performs projection processing. Data to be processed by the function unit 303 may be data stored in the storage unit 301, or may be data communicated with another AP or STA via the communication unit 306 to be described later.

The input unit 304 accepts various kinds of operations from a user. The output unit 305 performs various kinds of outputs for the user. Here, the output by the output unit 305 includes, for example, at least one of display on a screen, audio output by a loudspeaker, vibration output, and the like. Note that both the input unit 304 and the output unit 305 may be implemented by one module, like a touch panel.

The communication unit 306 controls wireless communication complying with the IEEE802.11 standard series, or controls IP communication. The communication unit 306 is a so-called radio chip, and may itself include one or more processors and memories. In this embodiment, the communication unit 306 can execute processing complying with at least the IEEE802.11ax standard. In addition, the communication unit 306 controls the antenna 307 to transmit and receive radio signals for wireless communication. The device communicates contents such as image data, document data, or video data with another communication device via the communication unit 306. The antenna 307 is an antenna that can transmit and receive signals in at least any one of, for example, a sub-GHz band, 2.4 GHz band, 5 GHz band, and 6 GHz band. Note that the frequency band (and a combination of frequency bands) to which the antenna 307 is adaptable is not particularly limited. The antenna 307 may be one antenna, or may be a set of two or more antennas to perform MIMO (Multi-Input and Multi-Output) transmission/reception. FIG. 3 shows one antenna 307, but the antenna may include two or more antennas (two or more sets of antennas) that are adaptable to different frequency bands.

Figure 2:
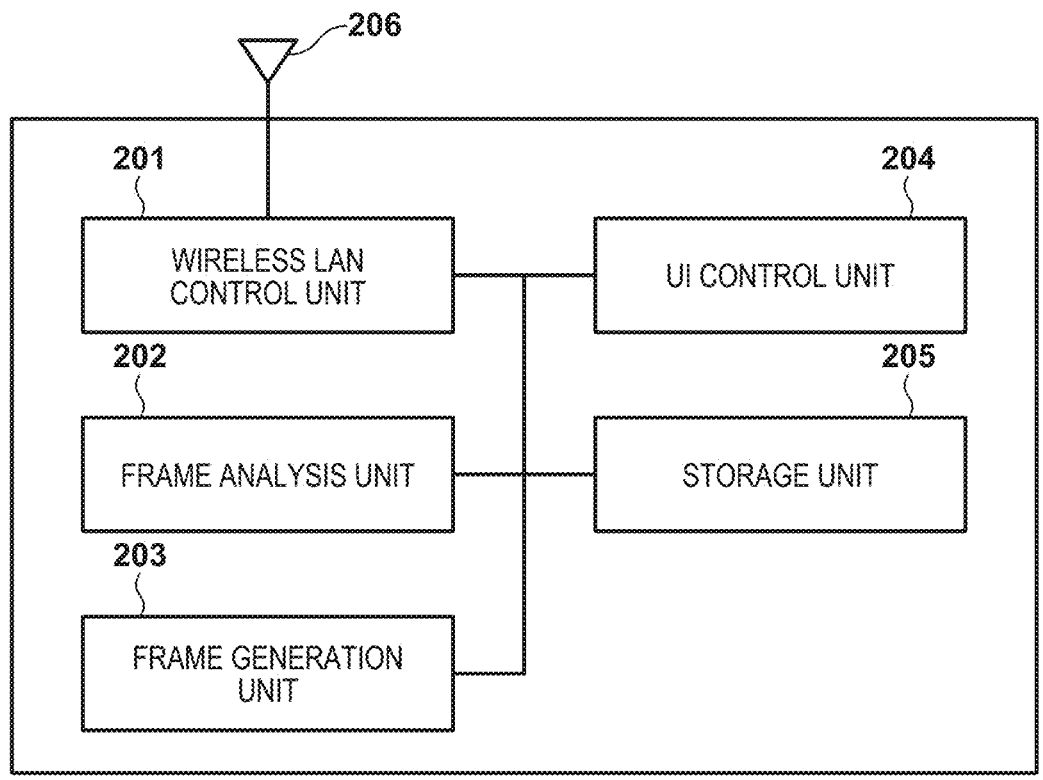
FIG. 2 is a block diagram showing an example of the functional configuration of a communication device.

FIG. 2 shows an example of the functional configuration of each of the communication devices (the AP and the STAs). As an example, the communication device includes a wireless LAN control unit 201, a frame analysis unit 202, a frame generation unit 203, a UI control unit 204, a storage unit 205, and an antenna 206.

The wireless LAN control unit 201 is configured to include circuits that transmit/receive radio signals to/from another wireless LAN device (for example, another AP or STA) using the antenna 206, and programs configured to control these. The wireless LAN control unit 201 executes communication control of wireless LAN such as transmission of a frame generated by the frame generation unit 203 and reception of a radio frame from another wireless LAN device in accordance with the IEEE802.11 standard series. The frame analysis unit 202 analyzes a radio frame received via the wireless LAN control unit 201. This analysis is done by reading the radio frame from the head. Note that the frame analysis unit 202 analyzes the physical layer (PHY) preamble of a radio frame, as will be described later, thereby operating to discard a radio frame for a standard (version) the communication device does not comply with. Since this allows the communication device to early interrupt analysis of a radio frame of a type the self-device does not comply with, the power consumption can be reduced. The frame generation unit 203 generates, for example, a radio frame including data to be transmitted to another AP or STA. In accordance with a standard the self-device complies with or, in some cases, a standard the partner device of communication complies with, the frame generation unit 203 generates a radio frame complying with a standard that enables communication between the self-device and the partner device. For example, if the communication device complies with IEEE802.11EHT, and the partner device complies with IEEE802.11ax, a radio frame complying with the IEEE802.11ax is generated and transmitted/received. The UI control unit 204 is configured to include hardware concerning user interfaces (UIs) such as a touch panel and buttons configured to accept an operation on the communication device by the user (not shown) of the communication device, and programs configured to control these. Note that the UI control unit 204 also has a function of, for example, presenting information to the user, such as display of an image or the like or audio output. The storage unit 205 is configured to include a storage device such as a ROM (Read Only Memory) or a RAM (Random Access Memory) configured to store programs to be executed by the communication device and various kinds of data.

(Procedure of Processing)

Figure 4:
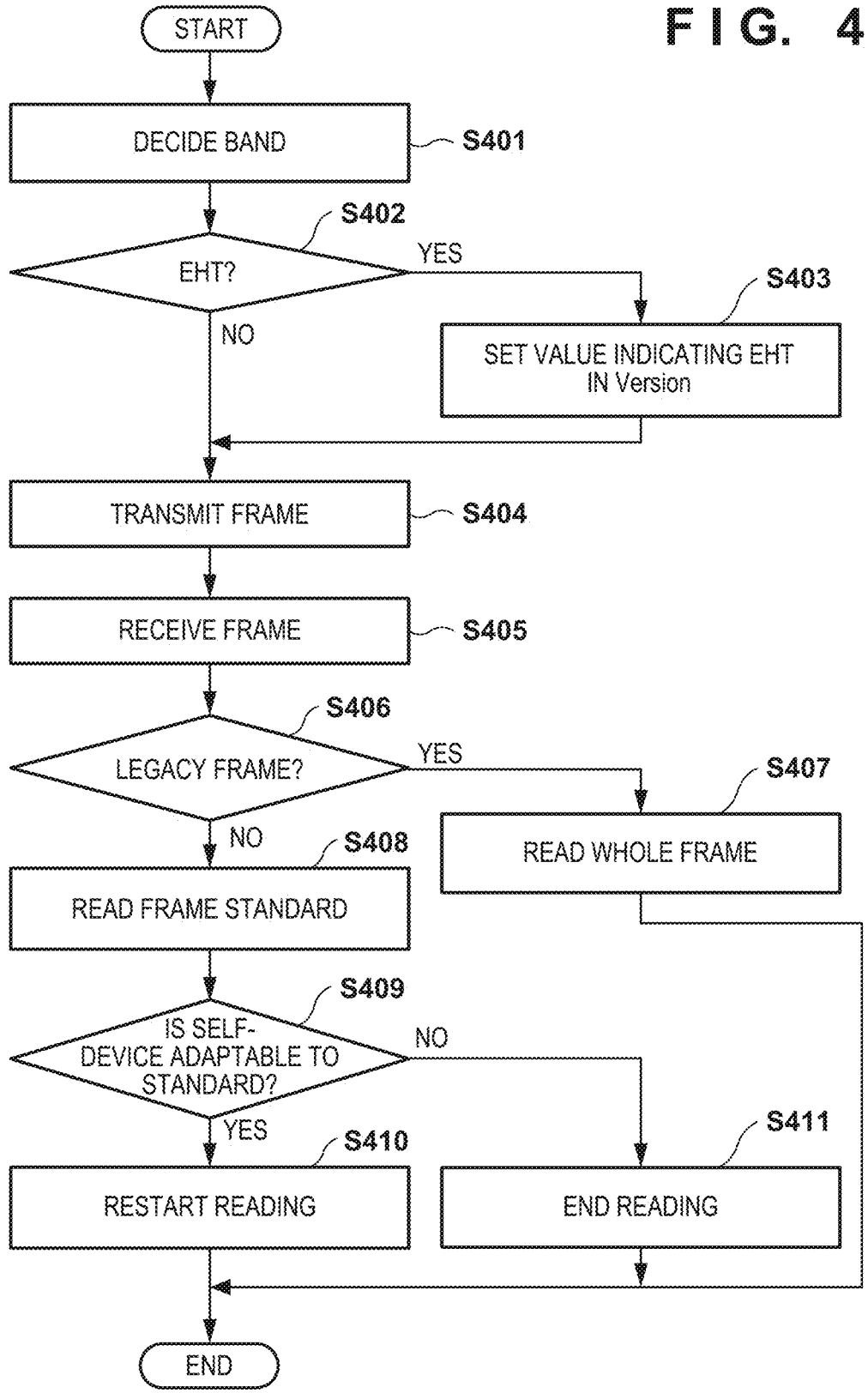
FIG. 4 is a flowchart showing an example of the procedure of processing to be executed in the communication device.

The procedure of processing to be executed by the communication device as described above will be described next. FIG. 4 shows an example of the procedure of processing to be executed by the communication devices (the AP and the STAs) according to this embodiment, which comply with IEEE802.11EHT. First, the communication device decides an operating frequency band (step S401). The decision of the operating frequency band is performed by the AP. That is, if the communication device is an AP, the operating frequency band is decided by a user operation of the communication device, or the like. If the communication device is an STA, it is decided that the STA operates in the operating frequency band decided by the AP of the connection destination. Note that the operating frequency band can be one of frequency bands of, for example, 2.4 GHz, 5 GHz, and 6 GHz. If another usable frequency band exists, the frequency band may be used. Note that in the following description, a frequency band of 2.4 GHz or 5 GHz, which is usable by communication devices complying with old-generation communication standards, is used.

After that, the communication device decides a standard a radio frame should comply with when transmitting the radio frame. Note that in this processing example, the communication device determines whether the standard is IEEE802.11EHT (step S402). The communication device decides the communication standard to be used based on, for example, the standard the self-device complies with and the standard the partner device complies with. For example, if both the communication device and the partner device comply with IEEE802.11EHT, the communication device decides to use the IEEE802.11EHT. If one of the communication device and the partner device complies with a successor standard of IEEE802.11EHT, and the other complies with IEEE802.11EHT but not with the successor standard, the communication device decides to use the IEEE802.11EHT. If one of the communication device and the partner device complies with IEEE802.11EHT, but the other complies with only an old-generation standard, the communication device decides to use the old-generation standard. For example, in communication between the AP 102 and the STA 103, since both comply with IEEE802.11EHT, it is decided to use the IEEE802.11EHT. In communication between the AP 102 and the STA 104, since the AP 102 complies with IEEE802.11EHT, but the STA 104 complies with only IEEE802.11ax, it is decided to use the IEEE802.11ax. In communication between the AP 102 and the STA 105, since the STA 105 complies with a successor standard of IEEE802.11EHT, but the AP 102 do not comply with the successor standard, it is decided to use the IEEE802.11EHT. Note that the "successor standard" here includes, for example, Wave2 of IEEE802.11EHT, and the like. That is, in this embodiment, different versions of IEEE802.11EHT, which are obtained by further improving, after formulation, the IEEE802.11EHT standard that uses radio frames to be discussed below, are also handled as successor standards.

Upon deciding to use the IEEE802.11EHT (YES in step S402), the communication device sets a field (for example, a Version subfield to be described later) indicating the type of the standard in the radio frame and sets a value indicating EHT in the field (step S403). Note that upon deciding to use a standard after the IEEE802.11EHT, the communication device can prepare a field indicating the type of the standard and set a value indicating the standard to be used in the field. In this case, in step S402, the communication device determines whether to use a standard after IEEE802.11EHT. If a standard after IEEE802.11EHT is to be used, an appropriate value can be set in the field indicating the type of the standard. The communication device generates a radio frame (PPDU) including such a field indicating the type of the standard. Note that PPDU is an acronym of Physical Layer (PHY) Protocol Data Unit. On the other hand, upon deciding to use an old-generation standard (legacy standard) before IEEE802.11EHT (NO in step S402), the communication device generates a radio frame (PPDU) in accordance with the old-generation standard. Then, the communication device transmits the generated radio frame (step S404). Note that radio frame transmission here also includes transmission of a beacon. That is, if the communication device is an AP, the communication device generates and transmits a beacon in accordance with the communication standard the self-device complies with. Note that if the self-device does not transmit a radio frame and only receives a radio frame from the partner device, the communication device may omit the processes of steps S402 to S404.

Processing at the time of signal reception will be described next. The communication device receives a radio frame from the partner device (step S405). Note that the partner device here indicates the partner device with which the communication device directly communicates wirelessly. For example, if the communication device is an STA, the partner device is the connected AP. If the communication device is an AP, the partner device is the STA connected to the self-device. The communication device determines whether the received radio frame is a radio frame of a legacy standard (step S406). Here, the legacy standard indicates the IEEE802.11a/b/g/n/ax standards. Upon determining that a radio frame of a legacy standard is received (YES in step S406), the communication device reads the whole radio frame (step S407). On the other hand, upon determining that a radio frame of a standard after the IEEE802.11ax standard, that is, a standard after IEEE802.11EHT is received (NO in step S406), the communication device reads the field indicating the type of the standard as described above (step S408). The communication device then determines whether the self-device is adaptable to the standard of the type indicated by a value set in the read field (whether an operation complying with the standard is possible) (step S409). For example, a communication device complying with IEEE802.11EHT determines whether the value set in the field is a value corresponding to IEEE802.11EHT. If the self-device is adaptable to the type of the standard of the radio frame (YES in step S409), the communication device continues the analysis of the radio frame and reads the whole radio frame (step S410). When the read of the radio frame is ended, the communication device continues the analysis while handling data stored in the data field as a frame of a MAC (Medium Access Control) layer. On the other hand, if the self-device is not adaptable to the type of the standard of the radio frame (NO in step S409), the communication device does not analyze the radio frame anymore and discards the radio frame (step S411). This makes it possible to prevent the communication device from unnecessarily continuing to read the radio frame of the standard to which the device is not adaptable and prevent waste of the power consumption of the communication device. Note that the communication device may perform only transmission of a radio frame, and if no radio frame is received, the processing from step S405 may be omitted.

In FIG. 4, as an example, the AP generates a Beacon frame including information indicating the standard the self-device complies with and sends it. The STA transmits a Probe Request frame based on the Beacon frame. The AP determines whether the Probe Request frame is a legacy frame, and if the Probe Request frame is not a legacy frame, determines whether the Probe Request frame is generated in accordance with the standard the self-device complies with. If the Probe Request frame is a legacy frame or is generated in accordance with the standard the self-device complies with, the AP performs analysis in the MAC layer. The AP can recognize, by the analysis in the MAC layer, that the frame is a Probe Request frame, and transmit the Probe Response frame. On the other hand, if the Probe Request frame is generated in accordance with a standard the self-device does not comply with, the AP discards the frame. Note that since the frame is discarded without performing analysis in the MAC layer, the AP does not recognize that the frame is a Probe Request frame. For this reason, the AP does not transmit the Probe Response frame. As described above, the communication device may execute the signal transmission processing in steps S402 to S404 and the signal reception processing in steps S405 to S411 in different communication opportunities, or may execute these processes as a series of processes in one communication opportunity.

Figure 5:
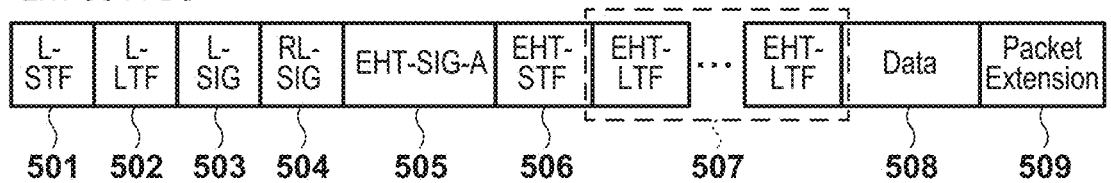
FIG. 5 is a view showing an example of the PHY frame structure of an EHT SU PPDU.
Figure 6:
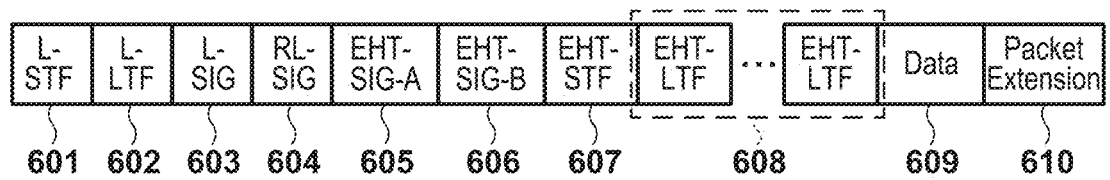
FIG. 6 is a view showing an example of the PHY frame structure of an EHT ER PPDU.
Figure 7:
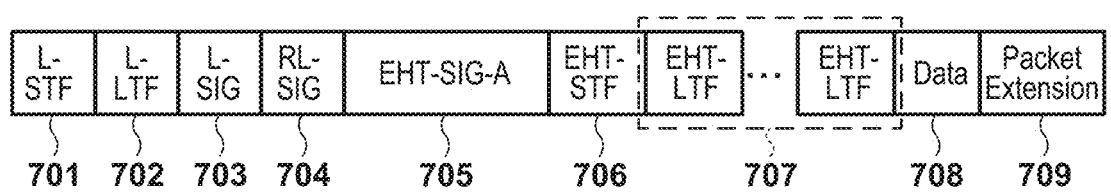
FIG. 7 is a view showing an example of the PHY frame structure of an EHT MU PPDU.
Figure 8:
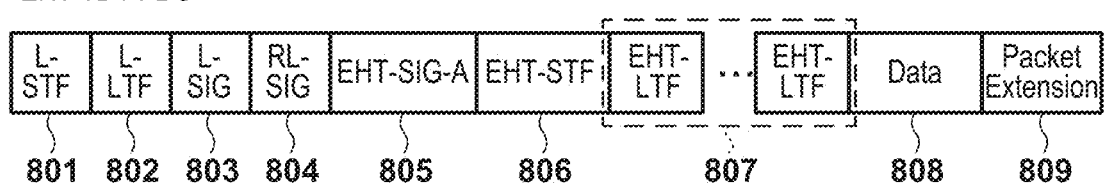
FIG. 8 is a view showing an example of the PHY frame structure of an EHT TB PPDU.

Examples of the structures of radio frames complying with IEEE802.11EHT are shown in FIGS. 5 to 8. FIG. 5 shows an example of an EHT SU (Single User) PPDU that is a PPDU for single-user communication, and FIG. 6 shows an example of an EHT MU (Multi User) PPDU for multi-user communication. FIG. 7 shows an example of an EHT ER (Extended Range) PPDU for long distance transmission, and FIG. 8 shows an example of an EHT TB (Trigger based) PPDU that is transmitted from the STA as a response to a trigger frame transmitted from the AP. The EHT ER PPDU is used when the communication area should be extended in communication between an AP and a single STA.

The PPDU includes fields including an STF (Short Training Field), an LTF (Long Training Field), and a SIG (Signal Field). As shown in FIG. 5, the head portion of the PPDU includes an L (Legacy)-STF 501, an L-LTF 502, and an L-SIG 503 for ensuring backward compatibility with the IEEE802.11a/b/g/n/ax standards. Note that each of frame formats shown in FIGS. 6 to 8 includes an L-STF (L-STF 601, 701, or 801), an L-LTF (L-LTF 602, 702, or 802), and an L-SIG (L-SIG 603, 703, or 803). Note that the L-LTF is arranged immediately after the L-STF, and the L-SIG is arranged immediately after the L-LTF. Note that each of the structures shown in FIGS. 6 to 8 further includes an RL-SIG (Repeated L-SIG, an RL-SIG 504, 604, 704, or 804) arranged immediately after the L-SIG. In the RL-SIG field, the contents of the L-SIG are repeatedly transmitted. The RL-SIG is used to enable a receiver to recognize that this PPDU complies with a standard after the IEEE802.11ax standard, and may be omitted in IEEE802.11EHT in some cases. In addition, a field for enabling the receiver to recognize that this PPDU complies with the IEEE802.11EHT may be provided in place of the RL-SIG.

The L-STF is used for detection of a PHY frame signal, AGC (Automatic Gain Control), timing detection, or the like. The L-LTF is used for highly accurate frequency/time synchronization, obtainment of propagation channel information (CSI: Channel State Information), or the like. The L-SIG is used for transmitting control information including information such as a data transmission rate and a PHY frame length. A legacy device complying with the IEEE802.11a/b/g/n/ax standards can decode the above-described various kinds of legacy fields.

Each PPDU further includes an EHT-SIG (EHT-SIG-A 505, 605, 705, or 805 and EHT-SIG-B 606) arranged immediately after the RL-SIG and used for transmitting control information for EHT. Each PPDU further includes an STF for EHT (EHT-STF 506, 607, 706, or 806) and an LTF for EHT (EHT-LTF 507, 608, 707, or 807). Each PPDU includes, after these controlling fields, a data field 508, 609, 708, or 808 and a Packet extension field 509, 610, 709, or 809. The portion including the fields from the L-STF to the EHT-LTF of each PPDU is referred to as a PHY preamble. Note that the respective fields of each PPDU may not necessarily be arranged in the order shown in each of FIGS. 5 to 8, or may include a new field not shown in each of FIGS. 5 to 8.

Note that each of FIGS. 5 to 8 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. In this case, the EHT-STF and one of the plurality of EHT-LTFs after the EHT-SIG field can be omitted.

The EHT-SIG-A 505 and 705 included in the EHT SU PPDU and the EHT ER PPDU include an EHT-SIG-A1 and an EHT-SIG-A2 necessary for reception of the PPDU, respectively, as shown in Tables 1 and 2 below. In addition, the EHT-SIG-A 605 of the EHT MU PPDU shown in FIG. 6 includes an EHT-SIG-A1 and an EHT-SIG-A2 necessary for reception of the PPDU, as shown in Tables 3 and 4 below. Furthermore, the EHT-SIG-A 805 of the EHT TB PPDU shown in FIG. 8 includes an EHT-SIG-A1 and an EHT-SIG-A2 necessary for reception of the PPDU, as shown in Tables 5 and 6 below. In this embodiment, in any frame structure, a "Version" subfield indicating which standard a radio frame is generated is included in 3 bits in the head of the EHT-SIG-A1.

TABLE 1

| | Bit Position | Subfield | Bit Count | Description |
|---|---|---|---|---|
| EHT-SIG-A1 | B0-B2 | Version | 3 | This subfield indicates a version of the frame. "0" is set if the frame is a EHT-frame. |
| | B3 | Format | 1 | "1" is set for an EHT PPDU and an EHT ER PPDU to distinguish them from an EHT TB PPDU. |
| | B4 | Beam Change | 1 | "1" is set if the pre-EHT of the PPDU is arranged in a space different from the first symbol of the EHT-LTF, or "0" is set if the pre-EHT is mapped similarly to the first symbol. |
| | B5 | UL/DL | 1 | This subfield indicates whether the PPDU is for UL or DL, and has the same value as TXVECTOR UPLINK_FLAG. |
| | B6-B9 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B10 | DCM | 1 | This subfield indicates whether Dual Carrier Modulation is applied to the data field. If "0" is set in the STBC field, "1" is set. (If both the DCM and STBC fields are "1", |

TABLE 1-continued

| Bit Position | Subfield | Bit Count | Description |
|---|---|---|---|
| | | | neither of them is applied) If DCM is not applied, "0" is set. |
| B11-B16 | BSS Color | 6 | 6-bit number for identifying the BSS |
| B17 | Reserved | 1 | Reserved field |
| B18-B21 | Spatial Reuse | 4 | This subfield indicates whether Spatial Reuse is allowed during transmission of this PPDU. The value of Spatial Reuse field encoding shown in the separate table is set. |
| B22-B23 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| B24-B25 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LTF and 0.8 μs GI, or "3" is set for 4 × EHT-LTF other than the above case and 3.2 μs GI. |
| B26-B28 | NSTS And Midamble Periodicity | 2 | This subfield indicates the number of space-time streams and the midamble period for frame synchronization. If the Doppler field is "0", "(the number of space-time streams) − 1" is set. If the Doppler field is "1", B23 and B24 indicate the number of space-time streams. B25 is "0" if the midamble period is 10, or "1" if the midamble period is 20. |

TABLE 2

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7 | Coding | 1 | "0" is set for BCC (Binary Convolutional Code), or "1" is set for LDPC (Low Density Parity Check). |
| | B8 | LDPC Extra Symbol Segment | 1 | This subfield indicates the presence/absence of an extra OFDM symbol segment for LDPC. |
| | B9 | STBC | 1 | "1" is set in this field if STBC (Space-Time Block Coding) is used and the DCM subfield is "0", "1" is also set if neither DCM nor STBC is applied, or "0" is set otherwise. |
| | B10 | Beamformed | 1 | "1" is set if beamforming steering is applied to the waveform of SU transmission. |
| | B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B13 | PE Disambiguity | 1 | Disambiguity field of Packet Extension |
| | B14 | Reserved | 1 | Reserved field |
| | B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

TABLE 3

| | Bit Position | Subfield | Bit Count | Description |
|---|---|---|---|---|
| EHT-SIG-A1 | B0-B2 | Version | 3 | This subfield indicates a version of the frame. "0" is set if the frame is a EHT-frame. |
| | B3 | UL/DL | 1 | This subfield indicates whether the PPDU is for UL or DL, and has the same value as TXVECTOR UPLINK_FLAG. |

TABLE 3-continued

| Bit Position | Subfield | Bit Count | Description |
| --- | --- | --- | --- |
| B4-B6 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| B7 | SIGB DCM | 1 | "1" is set if the HT-SIG-B field is modulated using DCM. |
| B8-B13 | BSS Color | 6 | 6-bit number for identifying the BSS |
| B14-B17 | Spatial Reuse | 4 | This subfield indicates whether Spatial Reuse is allowed during transmission of this PPDU. The value of Spatial Reuse field encoding shown in the separate table is set. |
| B18-B20 | Bandwidth | 3 | "0" is set for 20 MHz, "1" is set for 40 MHz, or "3" is set for 160 MHz (80 + 80 MHz). When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing, "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |
| B21-B24 | Number of EHT-SIG-B Symbols or MU-MTMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B25 | SIG Compression | 1 | "1" is set if a Common field exists in the EHT-SIG-B. |
| B26-B27 | GI + LTF size | 2 | This subfield indicates the Guard Interval period and the EHT-LTF Size. "0" is set for 4 × EHT-LTF and 0.8 µs GI, "1" is set for 2 × EHT-LTF and 0.8 µs GI, "2" is set for 2 × EHT-LTF and 1.6 µs GI, or "3" is for 4 × EHT-LTF and 3.2 µs GI. |

TABLE 3-continued

| | Bit Position | Subfield | Bit Count | Description |
|---|---|---|---|---|
| | B28 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7 | Reserved | 0 | Reserved field |
| | B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| | B11 | LDPC Extra Symbol Segment | 1 | This subfield indicates the presence/absence of an extra OFDM symbol segment for LDPC. |
| | B12 | STBC | 1 | When the number of users of each RU (Resource Unit) is not larger than 1, "1" is set to indicate that STBC is used for encoding. |
| | B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B15 | PE Disambiguity | 1 | Disambiguity field of Packet Extension |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

TABLE 5

| | Bit Position | Subfield | Bit Count | Description |
|---|---|---|---|---|
| EHT-SIG-A1 | B0-B2 | Version | 3 | This subfield indicates a version of the frame. "0" is set if the frame is an EHT-frame. |
| | B3 | Format | 1 | "1" is set for an EHT PPDU and an EHT ER PPDU. Otherwise, "0" is set. |
| | B4-B9 | BSS Color | 6 | 6-bit number for identifying the BSS. |
| | B10-B13 | Spatial Reuse 1 | 4 | This subfield indicates whether Spatial Reuse is permitted. Spatial Reuse is applied to the first 20 MHz band when the Bandwidth is 20, 40, or 80 MHz. Spatial Reuse is applied to the first 40 MHz band when the Bandwidth is 160 MHz/80 + 80 MHz. |

TABLE 5-continued

| Bit Position | Subfield | Bit Count | Description |
|---|---|---|---|
| | | | The value of SPATIAL_REUSE shown in another table is set. |
| B14-B17 | Spatial Reuse 2 | 4 | This subfield indicates whether Spatial Reuse is permitted. Spatial Reuse is applied to the second 20 MHz band when the Bandwidth is 20, 40, or 80 MHz. Spatial Reuse is applied to the second 40 MHz band when the Bandwidth is 160 MHz/80 + 80 MHz. The value of SPATIAL_REUSE shown in another table is set. |
| B18-B21 | Spatial Reuse 3 | 4 | This subfield indicates whether Spatial Reuse is permitted. Spatial Reuse is applied to the third 20 MHz band when the Bandwidth is 20, 40, or 80 MHz. Spatial Reuse is applied to the third 40 MHz band when the Bandwidth is 160 MHz/80 + 80 MHz. The value of SPATIAL REUSE shown in another table is set. |
| B22-B25 | Spatial Reuse 4 | 4 | This subfield indicates whether Spatial Reuse is permitted. Spatial Reuse is applied to the fourth 20 MHz band when the Bandwidth is 20, 40, or 80 MHz. Spatial Reuse is applied to the fourth 40 MHz band when the Bandwidth is 160 MHz/80 + 80 MHz. The value of SPATIAL_REUSE shown in another table is set. |
| B26 | Reserved | 1 | Reserved field |
| B27-B28 | Bandwidth | 2 | "0" is set for 20 MHz, "1" is set for 40 MHz, "2" is set for 80 MHz, and "3" is set for 160 (80 + 80) MHz. |

TABLE 6

| Bit Position | | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7-B15 | Reserved | 9 | Reserved field |
| | B16-B19 | CRC | 4 | The CRC of the EHT-SIG-A (29 bits of A1 and 16 bits up to B15 of A2, that is, 45 bits in total) field up to here. |

TABLE 6-continued

| Bit Position | Subfield | Bit Count | Description |
|---|---|---|---|
| B20-B25 | Tail | 6 | An area to set "0" to indicate the end portion to a trellis convolution decoder. |

For example, if a radio frame is generated in accordance with the IEEE802.11EHT standard, 0 is stored in the "Version" subfield. If a radio frame is generated in accordance with a successor standard immediately after the IEEE802.11EHT standard or a standard of a successor version after a change, 1 is stored in the "Version" subfield. Similarly, when the number of types of standards increases, different values of 2, 3, . . . , 7 are defined as the values to be set in the "Version" subfield in correspondence with the standards. As in Tables 1 to 6 described above, when a predetermined number of bits in the head of the EHT-SIG-A are used as the Version subfield, the communication device can early determine whether the self-device complies with the standard the radio frame complies with. As a result, the communication device can early end read (decoding processing) of a radio frame generated in accordance with a standard the self-device does not comply with, and power consumption associated with the read of the radio frame can be suppressed.

Note that in the examples of Tables 1 to 6, the Version subfield is defined as a 3-bit field. However, the present invention is not limited to this. For example, a field of four or more bits or two or less bits may be provided as the Version subfield. Also, the information of the Version may be notified at a position other than the 0th to second bits of the EHT-SIG-A1 field. In the examples of Tables 1 to 6, the Version subfield is provided in the EHT-SIG-A1. However, the subfield may be provided in another place. For example, an additional signal field may be provided before the EHT-SIG-A described above (for example, immediately after the L-LTF field or the L-SIG field), and the Version subfield may be newly included in the field. In an example, the new field can be arranged before the RL-SIG field. This makes it possible to discriminate the type of the standard of the frame at an earlier stage and obviate the necessity of analyzing subsequent frames. Due to this reason, the calculation time and power consumption needed for analyzing the frame can be suppressed.

Note that although a radio frame of IEEE802.11EHT has been described above, the same configuration can be employed even in a successor standard after IEEE802.11EHT. That is, for example, the above-described configuration in which a predetermined number of bits at a corresponding position of a field corresponding to the EHT-SIG-A store information indicating the type (version) of the standard can be employed even in a radio frame corresponding to a new communication standard. Similarly, the configuration in which a new field for setting information indicating the type of the standard is provided after the L-SIG (or RL-SIG) may be employed in a radio frame corresponding to a new communication standard. When a radio frame is received, the communication device can decode the radio frame up to the information indicating the type of the standard and then discard the radio frame based on the fact that the radio frame is generated in accordance with a standard the self-device does not comply with. Note that in addition to the AP 102 and the STAs 103 to 105, which are communication devices, an information processing device (for example, a radio chip) for generating the above-described PHY preamble can implement the present invention.

According to the present invention, it is possible to prevent a communication device from unnecessarily continuing to read a radio frame upon receiving a radio frame complying with a standard to which the device is not adaptable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device, comprising:
at least one memory that stores a set of instructions; and
at least one processing circuit, and
wherein the communication device is caused, by the at least one processing circuit executing the instructions and/or the at least one processing circuit itself operating, to perform operations comprising:
generating a physical layer (PHY) frame including a preamble; and
transmitting the PHY frame,
wherein the preamble includes a first Signal field, a Short Training field (STF) and a Long Training field (LTF),
wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

2. The communication device according to claim 1, wherein the STF is different from a Legacy Short Training field (L-STF).

3. The communication device according to claim 1, wherein the STF is an Extremely High Throughput Short Training field (EHT-STF).

4. The communication device according to claim 1, further comprising at least one antenna, and
wherein the PHY frame is transmitted via the at least one antenna.

5. The communication device according to claim 1, wherein three bits in a head of the first Signal field are allocated as the field indicating the version of the PHY frame.

6. The communication device according to claim 1, wherein the first Signal field further includes a bandwidth field indicating a bandwidth and a Modulation and Coding Scheme (MCS) field indicating a MCS.

7. The communication device according to claim 6, wherein the bandwidth field and the MCS field are allocated after the field indicating the version of the PHY frame.

8. The communication device according to claim 1, wherein the communication device is a station that communicates with an access point.

9. The communication device according to claim 1, wherein the communication device is an access point.

10. The communication device according to claim 1, wherein a successor version of the EHT is indicated in a case where 1 is set in the field indicating the version of the PHY frame.

11. The communication device according to claim 1, wherein in a case where the communication device supports the EHT but not a successor version of the EHT, the communication device transmits the PHY frame in which 0 is set in the field indicating the version of the PHY frame.

12. A communication device, comprising:
at least one memory that stores a set of instructions; and
at least one processing circuit, and
wherein the communication device is caused, by the at least one processing circuit executing the instructions and/or the at least one processing circuit itself operating, to perform operations comprising:
receiving a physical layer (PHY) frame including a preamble; and
decoding the PHY frame,
wherein the preamble includes a first Signal field, a Short Training field (STF) and a Long Training field (LTF),
wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

13. The communication device according to claim 12, wherein the STF is different from a Legacy Short Training field (L-STF).

14. The communication device according to claim 12, wherein the STF is an Extremely High Throughput Short Training field (EHT-STF).

15. A communication method executed by a communication device, comprising:
generating a physical layer (PHY) frame including a preamble; and
transmitting the PHY frame,
wherein the preamble includes a first Signal field, a Short Training field (STF) and a Long Training field (LTF),
wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

16. A communication method executed by a communication device, comprising:
    receiving a physical layer (PHY) frame including a preamble; and
    decoding the PHY frame,
    wherein the preamble includes a first Signal field, a Short Training field (STF) and Long Training field (LTF),
    wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

17. A non-transitory computer-readable storage medium that stores a set of instructions for causing a computer to perform operations comprising:
    generating a physical layer (PHY) frame including a preamble; and
    transmitting the PHY frame,
        wherein the preamble includes a first Signal field, a Short Training field (STF) and a Long Training field (LTF),
        wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

18. A non-transitory computer-readable storage medium that stores a set of instructions for causing a computer to perform operations comprising:
    receiving a physical layer (PHY) frame including a preamble; and
    decoding the PHY frame,
    wherein the preamble includes a first Signal field, a Short Training field (STF) and a Long Training field (LTF),
    wherein the first Signal Field is allocated before the STF and includes a field indicating a version of the PHY frame, wherein the field indicating the version of the PHY frame consists of 3 bits, and an Extremely High Throughput (EHT) is indicated in a case where 0 is set using the 3 bits in the field.

* * * * *